US011367227B2

(12) United States Patent
Balakrishnan et al.

(10) Patent No.: US 11,367,227 B2
(45) Date of Patent: Jun. 21, 2022

(54) METHOD AND APPARATUS FOR COMPUTER VISION BASED ATTENUATION MAP GENERATION

(71) Applicant: CANON MEDICAL SYSTEMS CORPORATION, Otawara (JP)

(72) Inventors: Karthikayan Balakrishnan, Vernon Hills, IL (US); Kent C. Burr, Vernon Hills, IL (US)

(73) Assignee: CANON MEDICAL SYSTEMS CORPORATION, Otawara (JP)

(*) Notice: Subject to any disclaimer, the term of this patent is extended or adjusted under 35 U.S.C. 154(b) by 154 days.

(21) Appl. No.: 16/941,015

(22) Filed: Jul. 28, 2020

(65) Prior Publication Data
US 2022/0036607 A1 Feb. 3, 2022

(51) Int. Cl.
G06T 11/00 (2006.01)
G06T 7/10 (2017.01)
G06T 15/08 (2011.01)
G06T 7/90 (2017.01)

(52) U.S. Cl.
CPC ............. G06T 11/006 (2013.01); G06T 7/10 (2017.01); G06T 7/90 (2017.01); G06T 15/08 (2013.01); G06T 2207/10048 (2013.01); G06T 2207/10081 (2013.01)

(58) Field of Classification Search
CPC ... G06T 11/003–008; G06T 7/10; G06T 7/90; G06T 15/08; G06T 2207/10048; G06T 2207/10081
See application file for complete search history.

(56) References Cited

U.S. PATENT DOCUMENTS

| | | | |
|---|---|---|---|
| 5,739,539 A * | 4/1998 | Wang | G06T 11/003 250/363.04 |
| 8,620,053 B2 | 12/2013 | Michel et al. | |
| 9,324,167 B2 * | 4/2016 | Blaffert | G06T 7/174 |
| 10,078,889 B2 | 9/2018 | Zhu et al. | |
| 2011/0103669 A1 * | 5/2011 | Michel | G06T 11/005 382/131 |

(Continued)

FOREIGN PATENT DOCUMENTS

EP 843868 A1 5/1998

OTHER PUBLICATIONS

M. Hofmann, et al., "A Machine Learning Approach for Determining the PET Attenuation Map from Magnetic Resonance Images", IEEE Nuclear Science Symposium and Medical Imaging Conference (NSS-MIC), Nov. 2006, 2 pages (Abstract only).

(Continued)

*Primary Examiner* — Sean T Motsinger
(74) *Attorney, Agent, or Firm* — Oblon, McClelland, Maier & Neustadt, L.L.P.

(57) ABSTRACT

A method of imaging includes obtaining projection data for an object representing an intensity of radiation detected along a plurality of rays through the object, obtaining an outline of the object via a secondary imaging system, the secondary imaging system using non-ionizing radiation, determining, based on the outline, a model and model parameters for the object, calculating, based on the model and the model parameters, a volumetric attenuation map for the object, and reconstructing, based on the projection data and the volumetric attenuation map, an attenuation-corrected volumetric image.

20 Claims, 11 Drawing Sheets

(56) References Cited

U.S. PATENT DOCUMENTS

| | | | |
|---|---|---|---|
| 2013/0248719 A1* | 9/2013 | Volokh | A61B 6/03 250/362 |
| 2014/0133728 A1* | 5/2014 | Blaffert | G06T 7/0012 382/131 |
| 2014/0158890 A1* | 6/2014 | Pistorius | G01T 1/2985 250/362 |
| 2014/0193054 A1* | 7/2014 | Blaffert | G06T 7/181 382/131 |
| 2017/0200271 A1* | 7/2017 | Atria | G06T 11/006 |
| 2018/0116621 A1* | 5/2018 | Berker | G06T 11/006 |
| 2018/0137656 A1* | 5/2018 | Li | G06T 7/30 |
| 2019/0066341 A1* | 2/2019 | Feng | A61B 6/037 |
| 2021/0212642 A1* | 7/2021 | Nett | A61B 6/5205 |
| 2021/0358119 A1* | 11/2021 | Vahala | G06N 3/08 |
| 2022/0036607 A1* | 2/2022 | Balakrishnan | G06T 15/08 |

OTHER PUBLICATIONS

Charles W. Anderson, et al., "Fast Generation of NURBS Surfaces from Polygonal Mesh Models of Human Anatomy", Computer Science Technical Report CS-99-101, Feb. 9, 2000, 17 pages.

* cited by examiner

CT

PET

METHOD AND APPARATUS FOR COMPUTER VISION BASED ATTENUATION MAP GENERATION

FIELD OF THE INVENTION

This disclosure relates to an imaging apparatus for tomographic image reconstruction based on obtained projection data and an obtained attenuation map of an object, the attenuation map of the object being obtained via a secondary imaging system included in the imaging apparatus, such as optical, infrared, or range-finding devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In emission tomography, knowledge of a scanned object's attenuation is used to accurately and quantitatively reconstruct the image. Without the attenuation map, the reconstructed image will exhibit artefacts that make the reconstruction harder to interpret. Formerly, knowledge of the object's attenuation is obtained from either a transmission scan using a radioisotope that revolved around the object, or, in more modern scanner topologies, from a CT (or MR) scan of the object.

Computed tomography (CT) and magnetic resonance (MR) systems and methods are widely used, particularly for medical imaging and diagnosis. CT systems generally create projection images of one or more sectional slices through a subject's body. A radiation source, such as an X-ray source, irradiates the body from one side. A collimator, generally adjacent to the X-ray source, limits the angular extent of the X-ray beam, so that radiation impinging on the body is substantially confined to a planar region (i.e., an X-ray projection plane) defining a cross-sectional slice of the body. At least one detector (and generally many more than one detector) on the opposite side of the body receives radiation transmitted through the body in the projection plane. The attenuation of the radiation that has passed through the body is measured by processing electrical signals received from the detector. In some implementations a multi slice detector configuration is used, providing a volumetric projection of the body rather than planar projections.

Typically the X-ray source is mounted on a gantry that revolves about a long axis of the body. The detectors are likewise mounted on the gantry, opposite the X-ray source. A cross-sectional image of the body is obtained by taking projective attenuation measurements at a series of gantry rotation angles, transmitting the projection data/sinogram to a processor via the slip ring that is arranged between a gantry rotor and stator, and then processing the projection data using a CT reconstruction algorithm (e.g., inverse Radon transform, a filtered back-projection, Feldkamp-based cone-beam reconstruction, iterative reconstruction, or other method). For example, the reconstructed image can be a digital CT image that is a square matrix of elements (pixels), each of which represents a volume element (a volume pixel or voxel) of the patient's body. In some CT systems, the combination of translation of the body and the rotation of the gantry relative to the body is such that the X-ray source traverses a spiral or helical trajectory with respect to the body. The multiple views are then used to reconstruct a CT image showing the internal structure of the slice or of multiple such slices.

In some cases, obtaining an attenuation map can prove difficult. Examples of such cases include when the CT (or MR) system may not be installed, available, or operational, when the CT scan may impart additional undesirable radiation dose, and when the CT field of view (FOV) may not cover the entire object being scanned, resulting in truncation artefacts. In these cases, where the attenuation image is not available, accurate emission tomographic reconstruction can be difficult. Thus, analytical methods used to generate an attenuation map using the provided features in the CT system or simple additions to the system are desired.

SUMMARY

The present disclosure relates to an imaging apparatus, including: processing circuitry configured to obtain projection data for an object representing an intensity of radiation detected along a plurality of rays through the object, obtain an outline of the object via a secondary imaging system, the secondary imaging system using non-ionizing radiation determine, based on the outline, a model and model parameters for the object, calculate, based on the model and the model parameters, a volumetric attenuation map for the object, and reconstruct, based on the projection data and the volumetric attenuation map, an attenuation-corrected volumetric image.

The disclosure additionally relates to a method of imaging, including: obtaining projection data for an object representing an intensity of radiation detected along a plurality of rays through the object, obtaining an outline of the object via a secondary imaging system, the secondary imaging system using non-ionizing radiation, determining, based on the outline, a model and model parameters for the object, calculating, based on the model and the model parameters, a volumetric attenuation map for the object, and reconstructing, based on the projection data and the volumetric attenuation map, an attenuation-corrected volumetric image.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
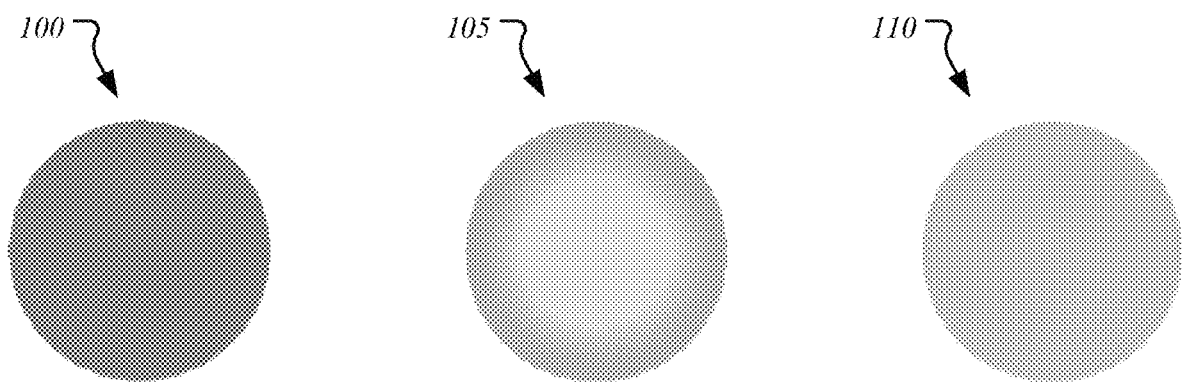
FIG. 1 shows example reconstructions for an object.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

In some imaging methods, three dimensional (3D) volumetric data sets can be used to generate attenuation data, for example, diagnostic quality data sets as in computed tomography (CT) and magnetic resonance (MR). The method described herein augments (in the case of truncation) or replaces (in the absence of) 3D volumetric scans with data obtained by processing two dimensional (2D) images (e.g. RGB, IR, etc.) or 3D surface scans (time of flight (ToF), radar, ultrasound, etc.).

The method described herein can include one or more visual imaging cameras (RGB, IR, etc.) that generate 2D images (e.g. RGB, IR, etc.) of an object being imaged from various angles. In some embodiments, the cameras themselves can already be an integral part of the scanner imaging system (for patient monitoring, for example), in which case no additional equipment is required. The 2D images can be processed to determine locations of surfaces of objects of interest. In some embodiments, the method described herein can be implemented using camera systems (time of flight, RADAR, structured light, etc.) which directly provide 3D surface scan information of the object.

FIG. 1 shows example reconstructions for an object 100. As previously described, without the attenuation map, the reconstructed image can exhibit artefacts that make the reconstruction harder to interpret. The object 100 may be scanned in, for example, a positron emission tomography (PET) system. In an example where the object 100 is simplified as a 2D circle, even though the circular object 100 may be uniform in attenuation, the gamma rays originating at the edges of the object 100 have less distance to travel through an attenuating medium to get to the detector as compared to gamma rays originating at the center of the object 100. Gamma rays originating in the center of the object 100 have to travel through one radius of the object 100 before they can make their way to the detectors. Gamma rays originating at or near the edge of the object 100 have available some less attenuated paths to the detectors and therefore appear brighter (higher energy). Thus, a first reconstruction 105 of the object 100 without attenuation correction can be non-uniform and exhibit artefacts, such as non-uniformity around the edge. A second reconstruction 110 of the object 100 with proper attenuation correction can be uniform and not include artefacts. The first reconstruction 105 can be based on the PET scan without an additional scan to correct for the attenuation. The additional scan used to correct the attenuation in the second reconstruction 110 can be via, for example, a volumetric CT scan. The PET data can provide functional information about the tracer distribution in the object 100, but the PET data is generally lower resolution and doesn't provide comprehensive anatomical information about the object 100 (or patient). Thus, the CT scanning system can provide the high resolution anatomical information from the attenuation data. When the two scans are used together during analysis, the accuracy of a diagnosis can increase due to the increased information combined from the CT (anatomical attenuation) and PET (tracer distribution) scans.

However, as previously described, an imaging apparatus may not include a secondary volumetric scanning system to determine attenuation in the object 100 via a volumetric scan, such as from the CT scanner system. Thus, the imaging apparatus may use a different secondary imaging system to augment or replace the volumetric scanning system. In the case of a CT scanner system, it may be desirable to reduce the radiation dose on a patient, and therefore using a non-ionizing imaging system may be used. The non-ionizing imaging system can utilize wavelengths of electromagnetic radiation in the range of approximately 400 nm to several mm, wherein the wavelengths can not penetrate the patient or impart tissue damage through ionization.

Figure 2:
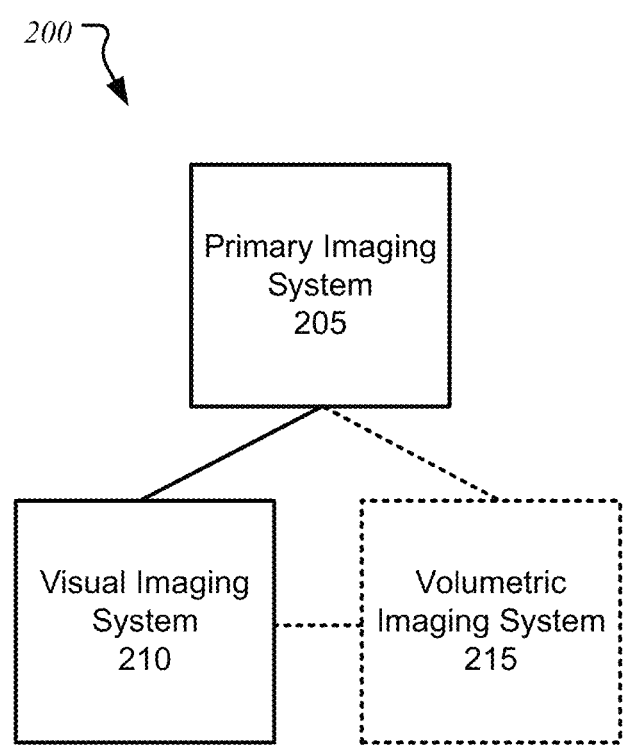
FIG. 2 shows a block diagram of an imaging apparatus, according to an embodiment of the present disclosure.

FIG. 2 shows a block diagram of an imaging apparatus 200, according to an embodiment of the present disclosure. In an embodiment, the imaging apparatus can include a primary imaging system 205, a secondary visual imaging system 210 (herein referred to as "visual imaging system 210"), and a volumetric imaging system 215. In an embodiment, the volumetric imaging system 215 can be replaced by the visual imaging system 210. The primary imaging system 205 can be, for example, the PET scanner as described above. The volumetric imaging system 215 can be, for example, the CT scanner system as described above. The visual imaging system 210 can be, for example, RGB vision cameras, stereoscopic cameras, infrared (IR) cameras, or structured light cameras, wherein structured light cameras are configured to project light in a pattern (similar to a matrix) onto an object. The distortion/expansion of that pattern on the reflected image can provide a depth perception or contour. The visual imaging system 210 can be, for example, range-finding cameras such as RADAR, laser, LIDAR, and ultrasound, or any combination thereof. For example, the visual imaging system 210 can include multiple RGB vision cameras disposed at different locations in the imaging apparatus 200 in order to image the patient at various angles. For example, the visual imaging system 210 can include multiple types of different imaging equipment, such as the RGB vision cameras in combination with the IR, RADAR, and LIDAR cameras. In general, the visual imaging system 210 can include imaging equipment configured to image the object with wavelengths of electromagnetic radiation within a range of approximately 400 nm to several mm. The visual imaging system 210 can be already an integrated part of the imaging apparatus 200, for example, for patient monitoring. Thus, in such an example, no additional equipment needs to be installed in the imaging apparatus 200. Other forms of the primary imaging systems 205 and the volumetric imaging systems 215 can be contemplated by those skilled in the art.

Notably, the visual imaging system 210 can generate 2D visual images of the object or patient. Furthermore, in the case of multiple cameras being included, the generated 2D visual images can be from various angles. The 2D visual images can be processed to determine locations of surfaces of objects of interest in order to generate an outline of the object. The outline of the object can then be utilized to, for example, analyze a size of the object, assign material properties to different portions of the object, and fit models to the object, as described herein. Alternatively, the proposed solution may be implemented using camera systems that can directly provide 3D surface information, such as the time of flight (ToF), RADAR, LIDAR, and structured light cameras. For example, a RADAR camera may provide the outline of the object based on a generated 3D point cloud. For example, a structured light camera may provide an outline of the object based on a projected known matrix of IR light. This may be especially effective in cases where the volumetric imaging system 215 is not available in the imaging apparatus 200 or not recommended for use. For example, volumetric imaging system 215 may not be installed on prototype PET systems that do not include the volumetric imaging system 215 yet. Other example cases have been covered, such as when the CT (or MR) system may not be installed, available, or operational, when the CT scan may impart additional undesirable radiation dose, and when the CT field of view (FOV) may not cover the entire object being scanned.

Figure 3A:
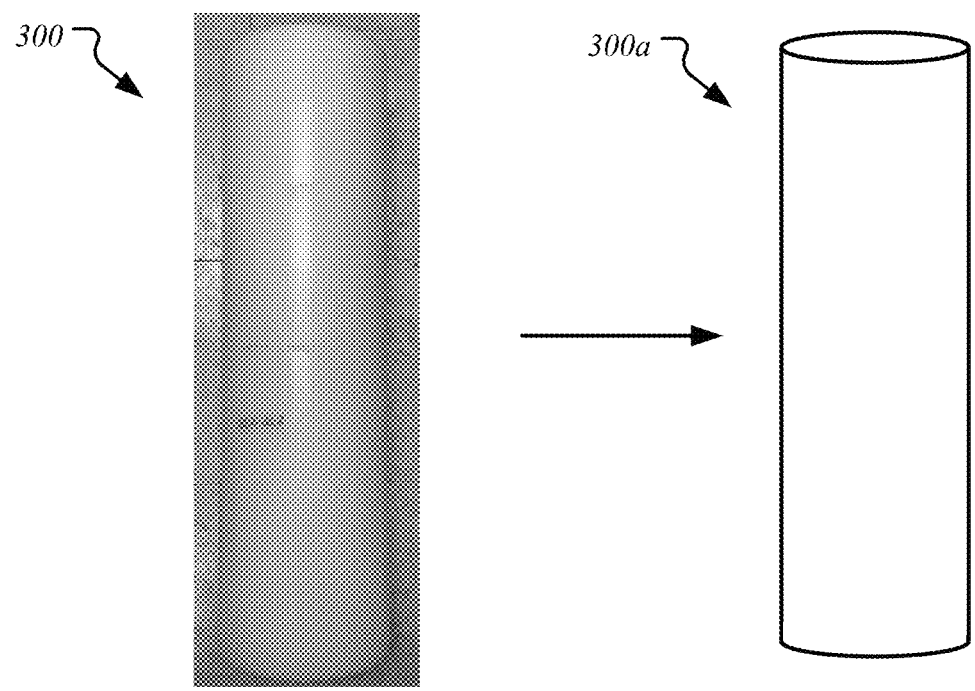
FIG. 3A shows a solid phantom being outlined, according to an embodiment of the present disclosure.

FIG. 3A shows a solid phantom 300 being outlined, according to an embodiment of the present disclosure. In an embodiment, the visual imaging system 210 can generate a 2D visual image (left) of the solid phantom 300 and infer a first outline 300a of the solid phantom 300. Subsequently, an assessment can be made that the solid phantom 300 is composed of plastic and a corresponding attenuation value can be assigned to the first outline 300a.

Figure 3B:
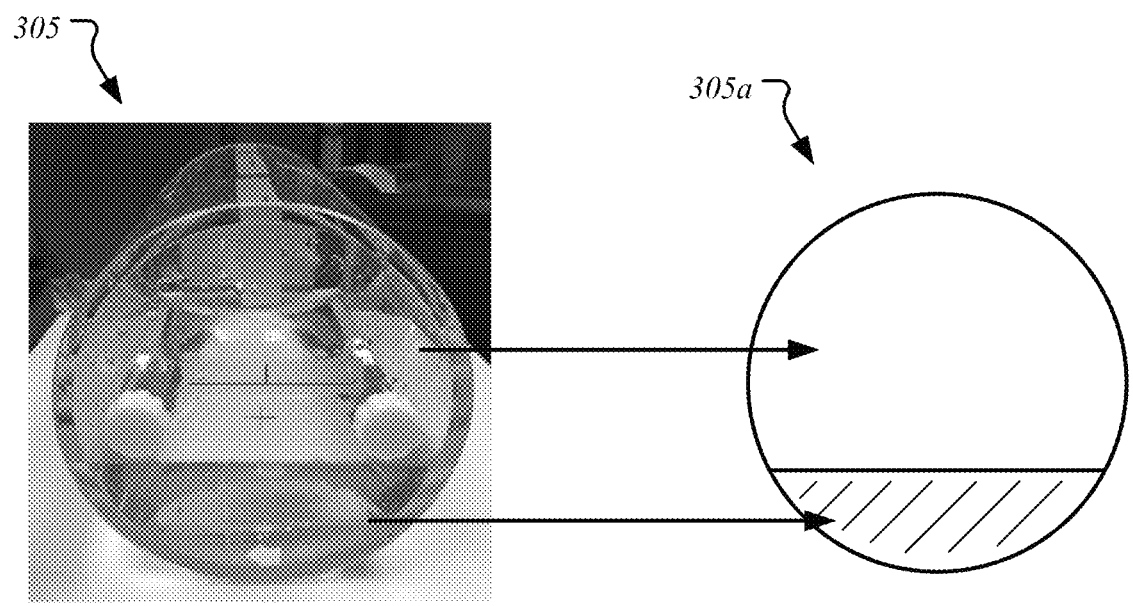
FIG. 3B shows a transparent phantom 305 being outlined, according to an embodiment of the present disclosure.

FIG. 3B shows a transparent phantom 305 being outlined, according to an embodiment of the present disclosure. In an embodiment, multiple objects/materials can be detected and assigned attenuation values. As shown, the transparent phantom 305 can be partially filled with a liquid, for example, water. The transparent phantom 305 itself can be composed of plastic, and an unfilled portion for the transparent phantom 305 can be air. Thus, the visual imaging system 210 can generate a 2D visual image (left) of the transparent phantom 305 and infer a second outline 305a. The second outline 305a can be decomposed into two objects: the plastic shell and the water. The second outline 305a can be segmented into two regions to yield an attenuation map with the transparent phantom's 305 shape and material properties.

More broadly, images and/or scans of the object are obtained, preferably from various angles, and the 2D image (s) or 3D surface scan from the visual imaging system 210 can be processed to obtain the location of surfaces and the geometrical extent of the object. The camera can be calibrated with known fiducials to learn spatial geometry and scale. Existing libraries such as OpenCV can be used for this purpose. Using fixed fiducial markers on the scanner can be used to translate pixel values to real units. The 3D shape of the object can then be evaluated by segmenting the object in the 2D image(s) or 3D surface scan to identify and extract relevant features. For example, the object can be segmented based on Hue Saturation Value (HSV) values. In another example, a machine learning algorithm can be used to evaluate the 3D shape of the object. The location and geometrical extent information can be used in combination with a model of the object to generate the attenuation map of the object. Free parameters from the 2D visual image or 3D surface scan information can be determined for the model, for example, scaling, translation, and rotation. Subsequently, the 3D volumetric attenuation map is calculated based on the model and the emission tomography data is reconstructed with attenuation correction based on the 3D volumetric attenuation map to generate an attenuation-corrected 3D volumetric image. Here, the model can include multiple types.

In an embodiment, a 3D computer aided design (CAD) model of the object (including known materials with known attenuation properties) can be used, wherein the free parameters can include a location and an orientation. This can be most applicable to imaging of rigid phantoms. An extension (described below) is the partially fillable phantom (the transparent phantom 305) where another parameter describes the fill level (or levels, if there are multiple fillable volumes).

In an embodiment, a library of pre-scanned CT or MR 3D volumes can be used. The free parameters can include a location, orientation, and scale factor (i.e. determining translation, rotation, and scaling parameters to match the model to location information derived from the 2D images of the 3D surface scans). This can be most applicable to phantoms or patients. To avoid truncation in the library, the library volumes could be obtained with "large bore" scanners. Patient couch attenuation data would be included.

Figure 4:
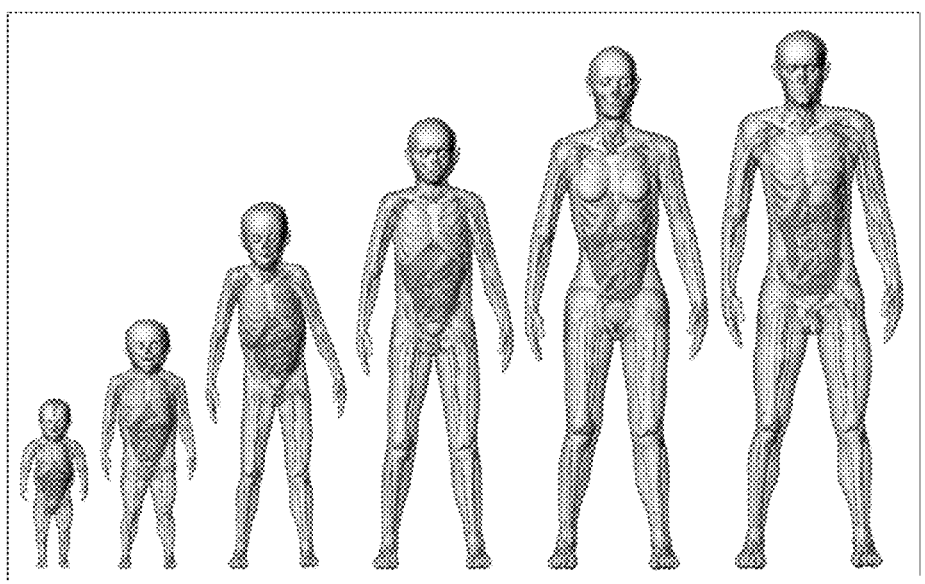
FIG. 4 shows an example of different size humans generated with XCAT, according to an embodiment of the present disclosure.

FIG. 4 shows an example of different size humans generated with XCAT, according to an embodiment of the present disclosure. In an embodiment, a 3D human digital model can be used, such as a Non-Uniform Rational B-Spline (NURBS)-based model. Examples of NURBS-based models include XCAT, and MCAT, among others. In addition to translations and rotations, the free parameters can include external sizes of certain body parts (e.g. patient height, shoulder width, arm length, etc.) and angles of joints. From parameters of visible body parts, locations and sizes of hidden parts or internal organs (e.g. bones, liver, lungs, etc.) can be determined based on most-probable values from population studies.

In an embodiment, with sufficient training, attenuation maps can be generated by machine learning algorithms. The input can include 2D images or 3D surface scans, and the output can include 3D volumetric attenuation maps. For example, the training data can include thousands of paired sets of 2D camera images and 3D volumetric attenuation maps.

Figure 5:
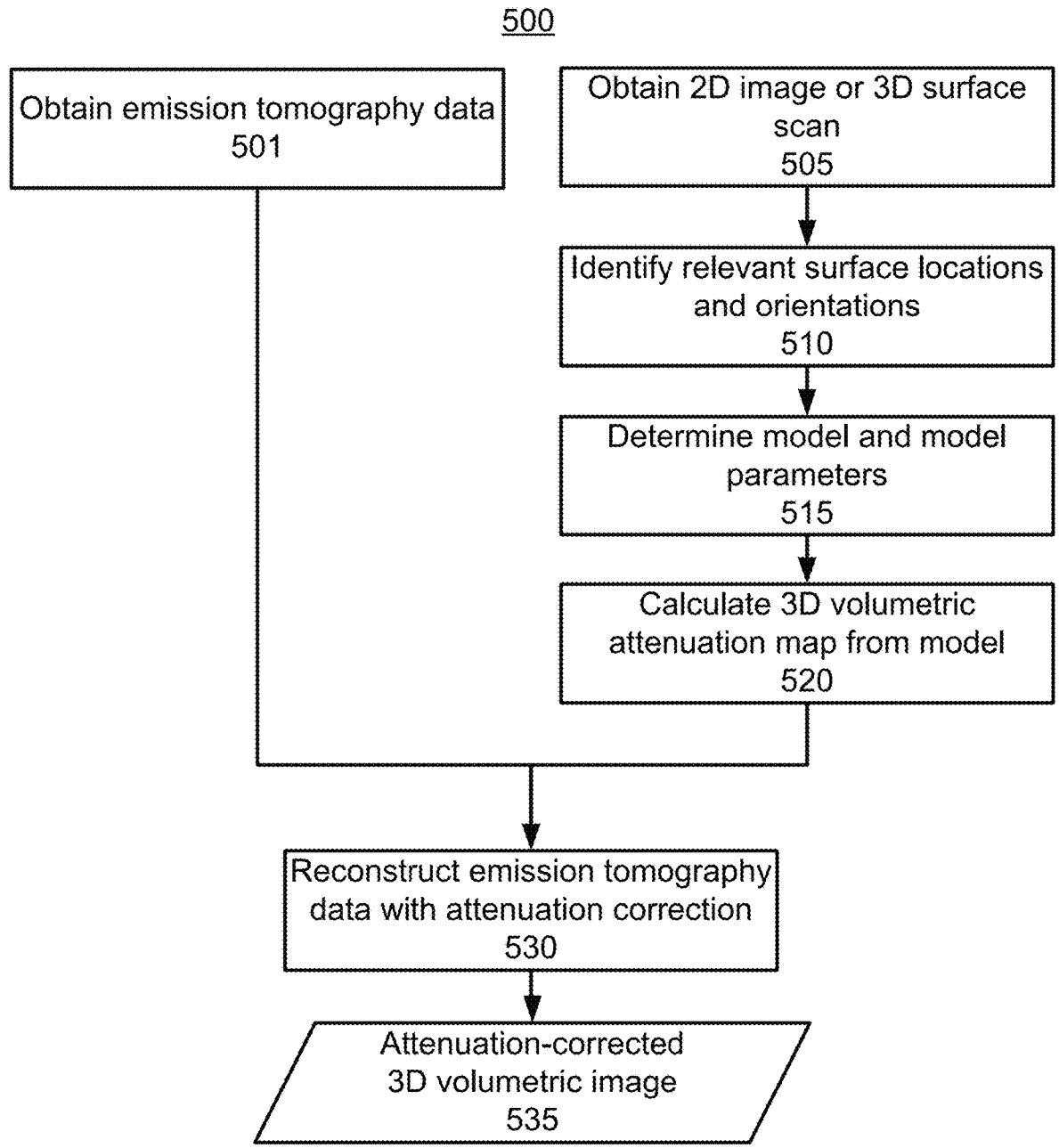
FIG. 5 shows a non-limiting example of a flow chart for a method of generating a volumetric image corrected for attenuation, according to an embodiment of the present disclosure.

FIG. 5 shows a non-limiting example of a flow chart for a method 500 of generating a volumetric image corrected for attenuation, according to an embodiment of the present disclosure. Step 501 and step 505 can occur concurrently. In step 501, emission tomography data is obtained via the primary imaging system 205. For example, the imaging apparatus 200 can obtain projection data representing an intensity of radiation detected along a plurality of rays through the object. In step 505, 2D visual image or 3D surface scan information is obtained via the visual imaging system 210. In step 510, relevant surface locations and orientations are identified. In step 515, a model and the model parameters are determined based on the outline, relevant surface locations, and relevant surface orientations from the 2D visual image or 3D surface scan information. In step 520, the 3D volumetric attenuation map is calculated based on the model. In step 530, the emission tomography data is reconstructed with attenuation correction based on the 3D volumetric attenuation map to generate an attenuation-corrected 3D volumetric image 535.

In an embodiment, the scanned object is a phantom and the visual imaging system 210 includes RGB vision cameras, and the method 500 can proceed as described herein. For imaging the phantom, the vision cameras are calibrated against known fiducial markers and scales. A library is generated including multiple photos and CT attenuation data. The CT attenuation data can optionally be converted to 511 keV attenuation in the library for PET. For fillable phantoms, fillable regions in the attenuation data can be identified, and attenuation maps can set the fillable regions to unfilled at the start. For the imaging apparatus 200 being a PET scanner, the PET data and the vision camera images (i.e. photos) are obtained. From the vision camera images, the most likely phantom from the library can be identified. In one example, machine learning can be used to select the highest-likelihood phantom from the library. The CT attenuation is registered via translating and rotating to match the phantom in the vision camera images and an attenuation map is generated. Optionally, for the phantom being a fillable phantom, image analysis can be used to identify a fill level of the material inside the fillable phantom, and then fillable attenuation can be added to the attenuation map. The emission tomography data (e.g. the PET or SPECT data) can be reconstructed using the generated attenuation map for attenuation correction. It may be appreciated that other types of cameras for the visual imaging system 210 have been described and may be used in place of the RGB vision cameras to image the phantom.

In an embodiment, the scanned object is a human patient. The patient adds another factor that can be considered since the patient's clothing can introduce errors when imaged via the RGB vision cameras. Namely, when the patient is wearing loose-fitting clothing or blankets, the outline of the patient can become difficult to determine. In such a case, a semi-penetrating imaging modality can be used, such as RADAR, millimeter-wave scanners, etc. For the human patient, "unclothed" and "tightly clothed" regions in the optical images can be identified. For example, a "tightly clothed" region can include a shirt that is stretched across the patient's stomach or chest area. In one example, machine learning can be used to identify the regions. In another example, a human user can use a GUI to "click" on and identify the regions, and then image analysis can enlarge or expand the "clicked" area to cover the entire region of interest. Parameters for a human model can be generated based on the identified "unclothed" and "tightly clothed" regions. For example, the parameters for the human model can include dimensions of body parts and angles of articulated limbs. Then, the attenuation map can be generated based on the human model, for example, by using the XCAT digital phantom of FIG. 4.

Figure 6A:
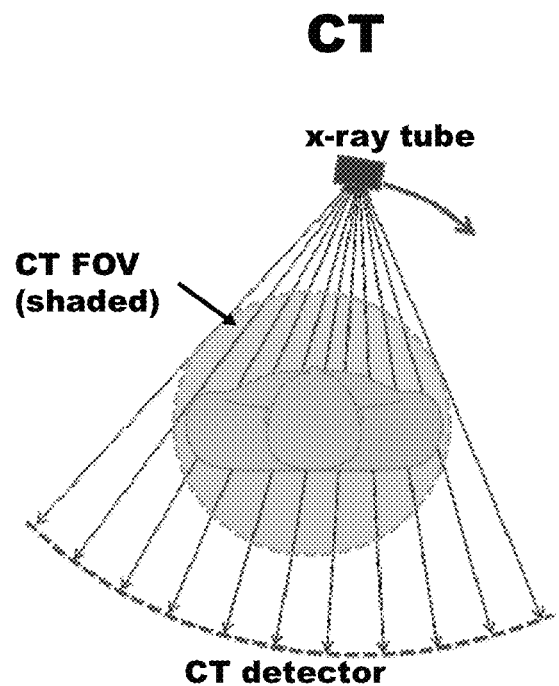
FIG. 6A shows a FOV for a CT scanner, according to an embodiment of the present disclosure.
Figure 6B:
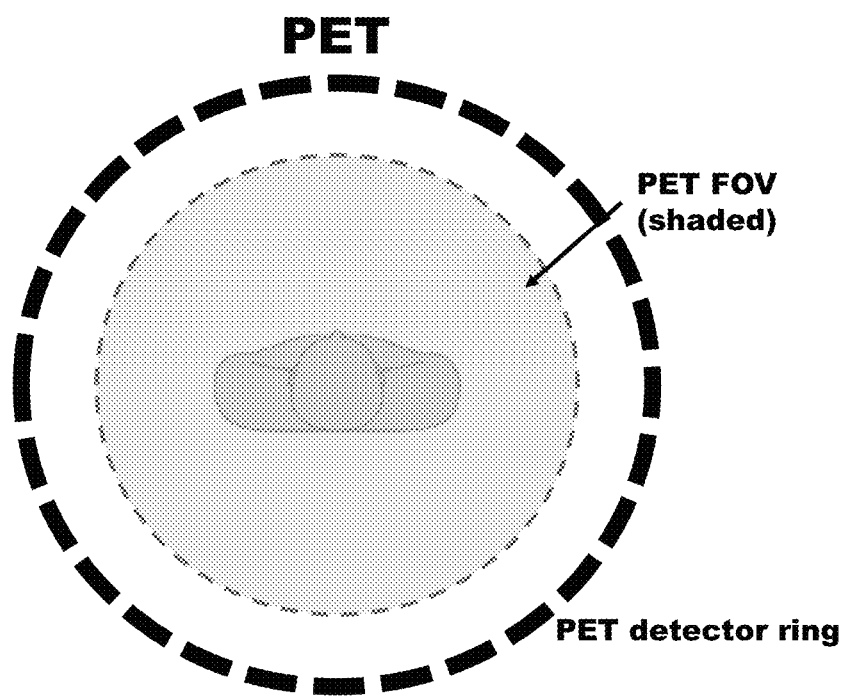
FIG. 6B shows a FOV for a PET scanner, according to an embodiment of the present disclosure.

FIG. 6A shows a FOV for a CT scanner, according to an embodiment of the present disclosure. FIG. 6B shows a FOV for a PET scanner, according to an embodiment of the present disclosure. In an embodiment, the FOV of the PET scanner can be often times larger than the FOV of the CT scanner in a PET/CT system. When objects extend beyond the CT's FOV, CT truncation artifacts can arise. Concomitantly, these CT truncation artifacts can result in PET attenuation correction artifacts.

Figure 6C:
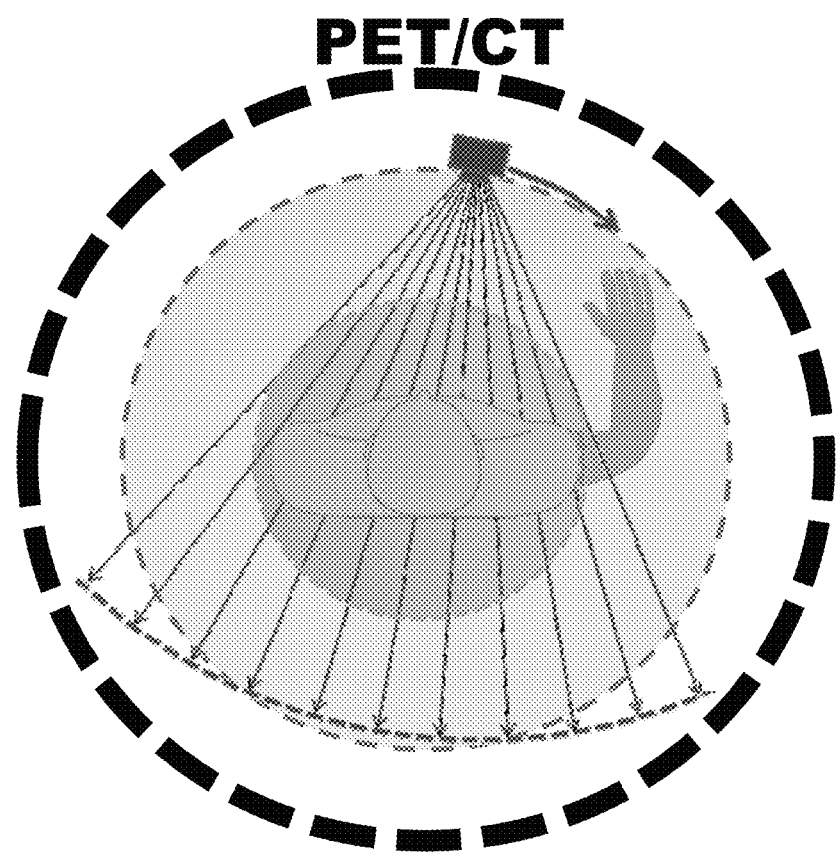
FIG. 6C shows an object in a PET/CT scanner with an object outside the scanner's FOV, according to an embodiment of the present disclosure.

FIG. 6C shows an object in a PET/CT scanner with an object outside the scanner's FOV, according to an embodiment of the present disclosure. In an embodiment, when an object (for example, the patient's arm) extends beyond the CT's FOV, images from the camera(s) in the visual imaging system 210 can be used to "fill in" the missing information. For example, the camera images can be used to generate parameters for the human model (e.g. dimensions of body parts, angles of articulated limbs, etc.). Within the CT's FOV, the (more accurate) CT images can be used for PET attenuation correction, and the augmented attenuation map from the cameras can be used outside the CT's FOV.

Figure 7:
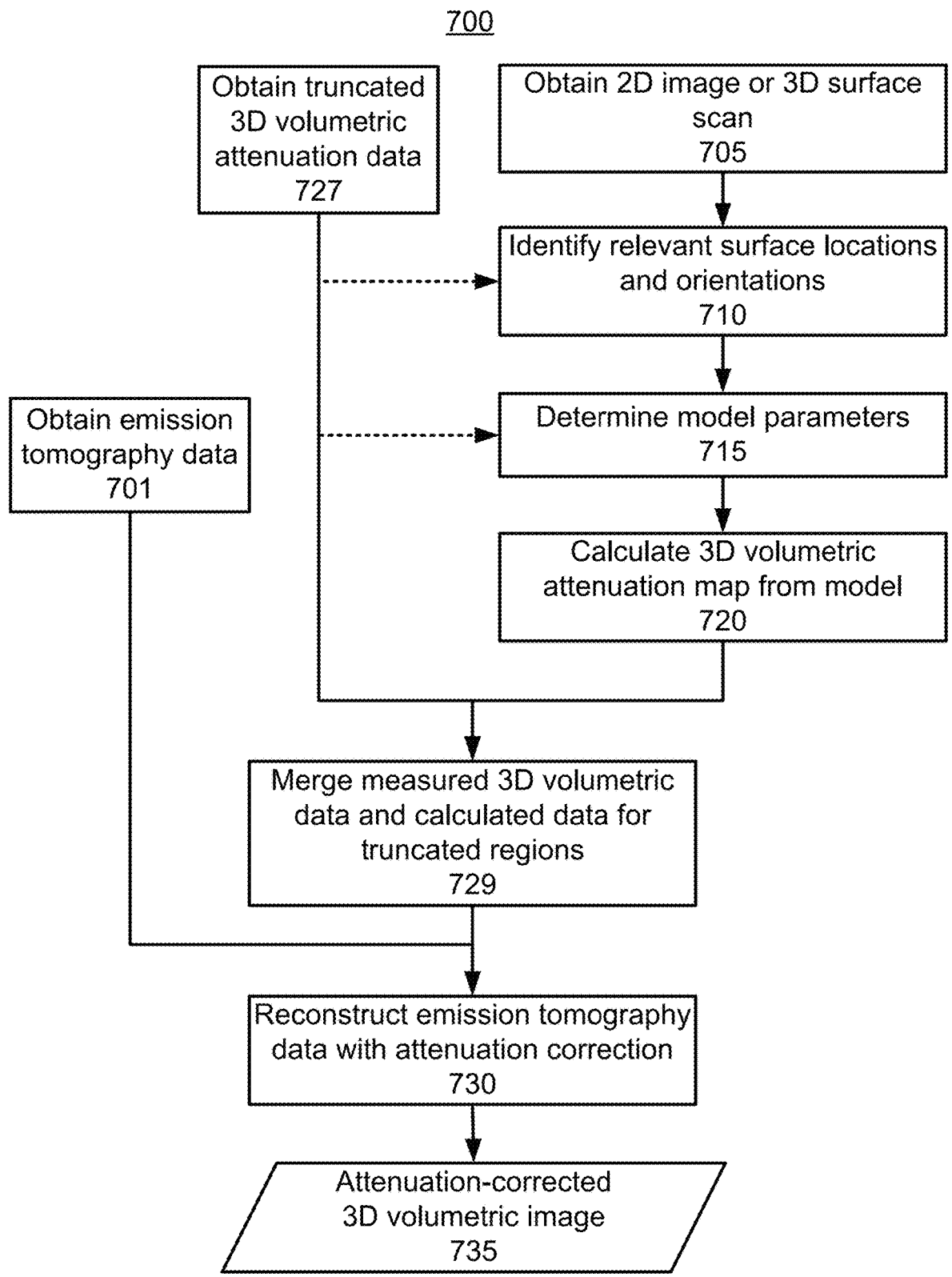
FIG. 7 shows a non-limiting example of a flow chart for a method of generating a volumetric image corrected for attenuation with truncated 3D volumetric attenuation data, according to an embodiment of the present disclosure.

FIG. 7 shows a non-limiting example of a flow chart for a method 700 of generating a volumetric image corrected for attenuation with truncated 3D volumetric attenuation data, according to an embodiment of the present disclosure. The method 700 is similar to the method 500, but with two optional paths shown and steps 727 and 729. As previously described, step 701 and step 705 can occur concurrently. In step 701, emission tomography data is obtained via the primary imaging system 205. In step 705, 2D visual image or 3D surface scan information is obtained via the visual imaging system 210. In step 710, relevant surface locations and orientations are identified. In step 715, a model and the model parameters are determined based on the outline, relevant surface locations, and relevant surface orientations from the 2D visual image or 3D surface scan information. Step 720 is also slightly modified. In step 720, the 3D volumetric attenuation map for truncated regions is calculated based on the model. In step 727, truncated 3D volumetric attenuation data is obtained via the volumetric imaging system 215. For example, the volumetric imaging system 215 can be the CT scanner or an MR scanner. Notably, an optional path connects step 727 with step 710, wherein the truncated 3D volumetric attenuation data can be combined with the 2D images/3D surface scan to produce a better ability to correctly identify relevant features. Another optional path connects step 727 with step 715, wherein the truncated 3D volumetric attenuation data can be combined with the model parameters to improve estimation of the model parameters. For example, in the case where the model parameters includes angles of articulated joints, if the patient is covered by a bulky blanket, the truncated 3D volumetric attenuation data can allow identification of the angle of a limb (within the non-truncated region) which cannot be easily identified in the 2D images/3D surface scan. Having the better estimate of angle information might result in better estimation of the attenuation in the truncated region. In step 729, the obtained truncated 3D volumetric attenuation data and the calculated data for the truncated regions can be merged. In step 730, the emission tomography data is reconstructed with attenuation correction based on the 3D volumetric attenuation map (with calculated data for the truncated regions) to generate an attenuation-corrected 3D volumetric image 735.

The methods 500 and 700 provide attenuation correction to reduce artefacts during reconstruction of the image of the patient. Advantageously, the methods provide: i) fast generation of vision images (RGB optical, IR, 3D surface contour); ii) minimization or complete elimination of time and cost-expensive transmission scans (via a rotating line source or CT images); iii) radiation dose reduction when obtaining the attenuation map for human patients; and iv) in-fill of missing or truncated parts of the scanned object due to truncated FOV of CT or MR scanners. The following descriptions provide details for a CT scanner and a PET scanner separately, but it may be appreciated that the two scanners can be combined into a single imaging apparatus according to the embodiments described herein.

Figure 8:
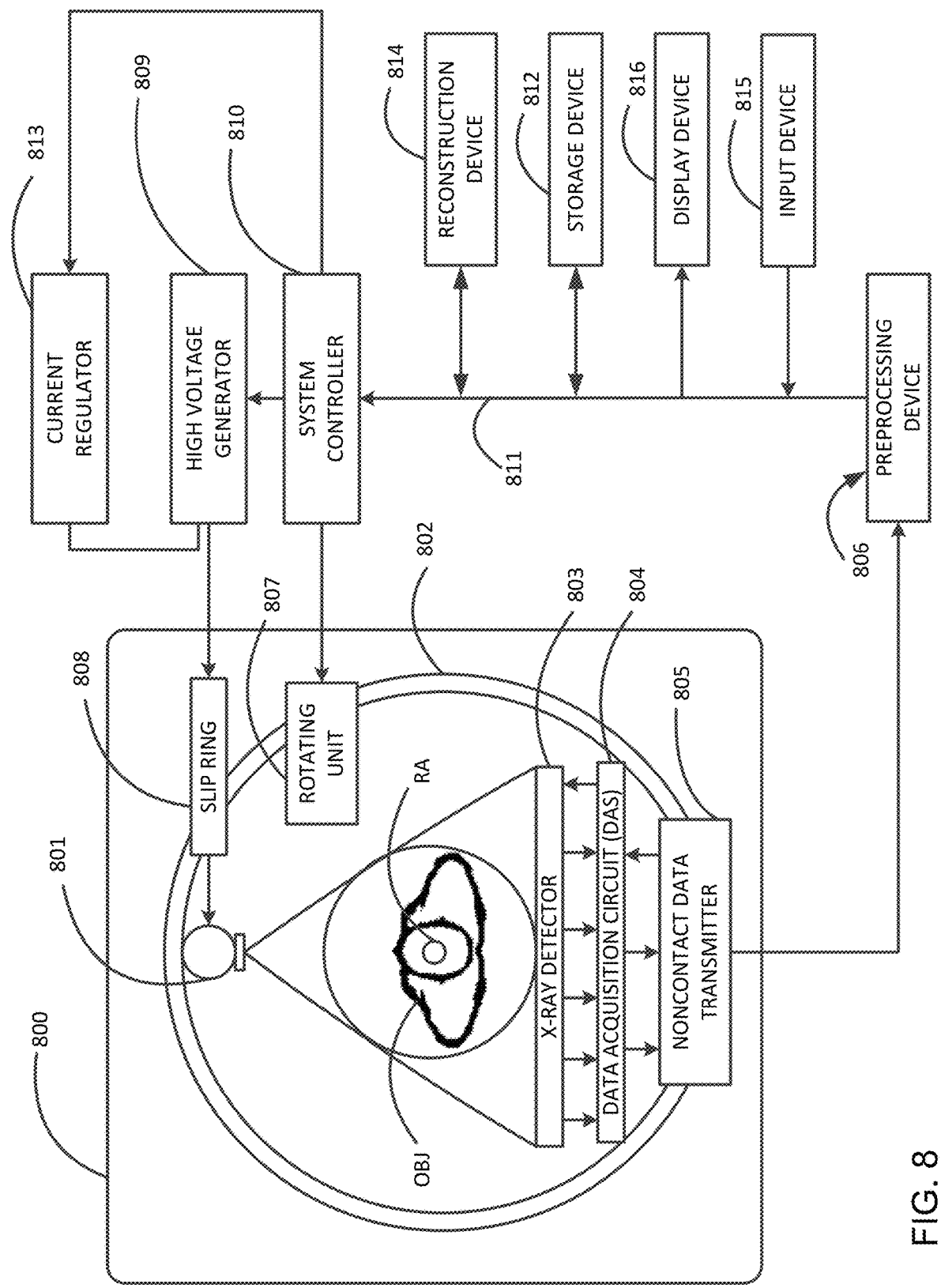
FIG. 8 shows a schematic of an implementation of a CT scanner, according to an exemplary embodiment of the present disclosure.

FIG. 8 shows a schematic of an implementation of a CT scanner according to an exemplary embodiment of the present disclosure. Referring to FIG. 8, a radiography gantry 800 is illustrated from a side view and further includes an X-ray tube 801, an annular frame 802, and a multi-row or two-dimensional-array-type X-ray detector 803. The X-ray tube 801 and X-ray detector 803 are diametrically mounted across an object OBJ on the annular frame 802, which is rotatably supported around a rotation axis RA (or an axis of rotation). A rotating unit 807 rotates the annular frame 802 at a high speed, such as 0.4 sec/rotation, while the object OBJ is being moved along the axis RA into or out of the illustrated page.

X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present disclosure can be applied to either type. The rotate/rotate type will be used as an example for purposes of clarity.

The multi-slice X-ray CT apparatus further includes a high voltage generator 809 that generates a tube voltage applied to the X-ray tube 801 through a slip ring 808 so that the X-ray tube 801 generates X-rays. The X-rays are emitted towards the object OBJ, whose cross sectional area is represented by a circle. For example, the X-ray tube 801 having an average X-ray energy during a first scan that is less than an average X-ray energy during a second scan. Thus, two or more scans can be obtained corresponding to different X-ray energies. The X-ray detector 803 is located at an opposite side from the X-ray tube 801 across the object OBJ for detecting the emitted X-rays that have transmitted through the object OBJ. The X-ray detector 803 further includes individual detector elements or units.

The CT apparatus further includes other devices for processing the detected signals from X-ray detector 803. A data acquisition circuit or a Data Acquisition System (DAS) 804 converts a signal output from the X-ray detector 803 for each channel into a voltage signal, amplifies the signal, and further converts the signal into a digital signal. The X-ray detector 803 and the DAS 804 are configured to handle a predetermined total number of projections per rotation (TPPR).

The above-described data is sent to a preprocessing device 806, which is housed in a console outside the radiography gantry 800 through a non-contact data transmitter 805. The preprocessing device 806 performs certain corrections, such as sensitivity correction on the raw data. A memory 812 stores the resultant data, which is also called projection data at a stage immediately before reconstruction processing. The memory 812 is connected to a system controller 810 through a data/control bus 811, together with a reconstruction device 814, input device 815, and display 816. The system controller 810 controls a current regulator 813 that limits the current to a level sufficient for driving the CT system.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 801 and the X-ray detector 803 are diametrically mounted on the annular frame 802 and are rotated around the object OBJ as the annular frame 802 is rotated about the rotation axis RA. In the fourth-generation geometry system, the detectors are fixedly placed around the patient and an X-ray tube rotates around the patient. In an alternative embodiment, the radiography gantry 800 has multiple detectors arranged on the annular frame 802, which is supported by a C-arm and a stand.

The memory 812 can store the measurement value representative of the irradiance of the X-rays at the X-ray detector unit 803. Further, the memory 812 can store a dedicated program for executing, for example, various steps of the methods 110, 150, 200, and 300 for training a neural network and reducing imaging artifacts.

The reconstruction device 814 can execute various steps of the methods 110, 150, 200, and 300. Further, reconstruction device 814 can execute pre-reconstruction processing image processing such as volume rendering processing and image difference processing as needed.

The pre-reconstruction processing of the projection data performed by the preprocessing device 806 can include correcting for detector calibrations, detector nonlinearities, and polar effects, for example.

Post-reconstruction processing performed by the reconstruction device 814 can include filtering and smoothing the image, volume rendering processing, and image difference processing as needed. The image reconstruction process can implement various of the steps of methods 110, 150, 200, and 300 in addition to various CT image reconstruction methods. The reconstruction device 814 can use the memory to store, e.g., projection data, reconstructed images, calibration data and parameters, and computer programs.

The reconstruction device 814 can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory 812 can be non-volatile, such as ROM, EPROM, EEPROM or FLASH memory. The memory 812 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction device 814 can execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display 816. The display 816 can be an LCD display, CRT display, plasma display, OLED, LED or any other display known in the art.

The memory 812 can be a hard disk drive, CD-ROM drive, DVD drive, FLASH drive, RAM, ROM or any other electronic storage known in the art.

The PCDs can use a direct X-ray radiation detectors based on semiconductors, such as cadmium telluride (CdTe), cadmium zinc telluride (CZT), silicon (Si), mercuric iodide (HgI$_2$), and gallium arsenide (GaAs). Semiconductor based direct X-ray detectors generally have much faster time response than indirect detectors, such as scintillator detectors. The fast time response of direct detectors enables them to resolve individual X-ray detection events. However, at the high X-ray fluxes typical in clinical X-ray applications some pile-up of detection events will occur. The energy of a detected X-ray is proportional to the signal generated by the direct detector, and the detection events can be organized into energy bins yielding spectrally resolved X-ray data for spectral CT.

Figure 9A:
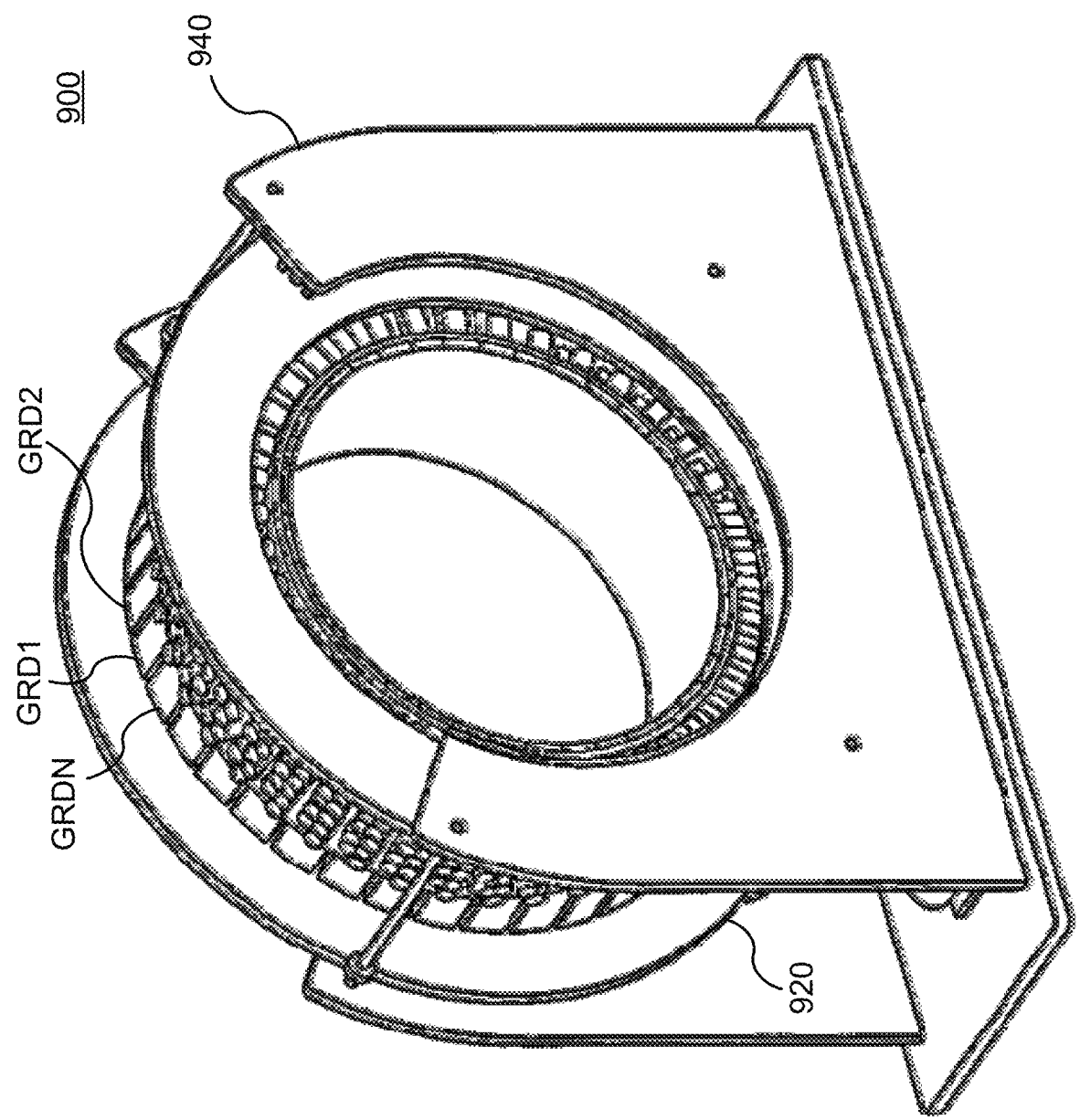
FIG. 9A shows a perspective view of a positron-emission tomography (PET) scanner, according to an embodiment of the present disclosure.
Figure 9B:
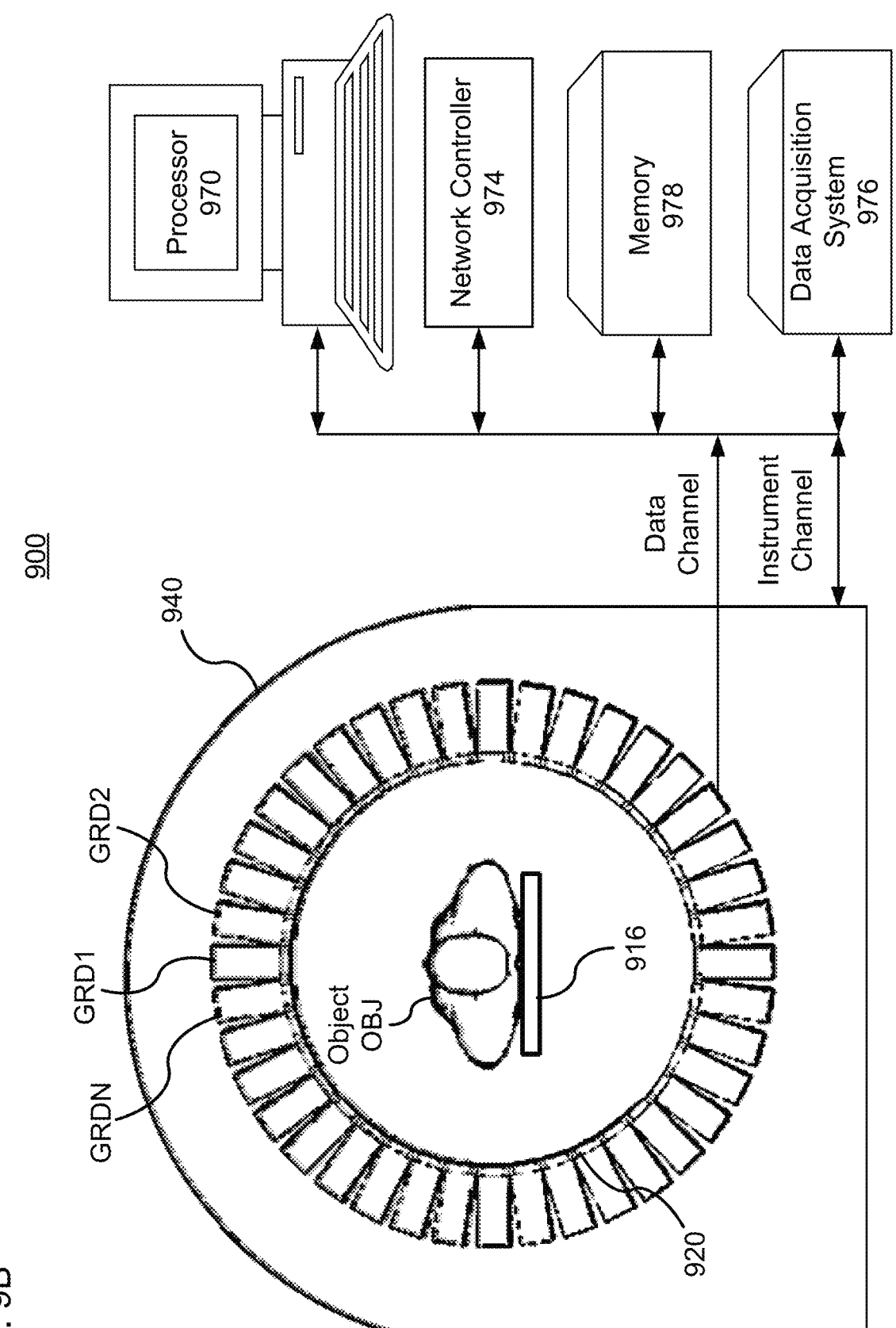
FIG. 9B shows a schematic view of a PET scanner, according to an embodiment of the present disclosure.

FIGS. 9A and 9B show a non-limiting example of a PET scanner 900 that can implement the methods 100 and 200. The PET scanner 900 includes a number of gamma-ray detectors (GRDs) (e.g., GRD1, GRD2, through GRDN) that are each configured as rectangular detector modules. According to one implementation, the detector ring includes 40 GRDs. In another implementation, there are 48 GRDs, and the higher number of GRDs is used to create a larger bore size for the PET scanner 900.

Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs.

Alternatively, the scintillation photons can be detected by an array a silicon photomultipliers (SiPMs), and each individual detector crystals can have a respective SiPM.

Each photodetector (e.g., PMT or SiPM) can produce an analog signal that indicates when scintillation events occur, and an energy of the gamma ray producing the detection event. Moreover, the photons emitted from one detector crystal can be detected by more than one photodetector, and, based on the analog signal produced at each photodetector, the detector crystal corresponding to the detection event can be determined using Anger logic and crystal decoding, for example.

FIG. 9B shows a schematic view of a PET scanner system having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIGS. 9A and 9B. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 9B shows an example of the arrangement of the PET scanner 900, in which the object OBJ to be imaged rests on a table 916 and the GRD modules GRD1 through GRDN are arranged circumferentially around the object OBJ and the table 916. The GRDs can be fixedly connected to a circular component 920 that is fixedly connected to the gantry 940. The gantry 940 houses many parts of the PET imager. The gantry 940 of the PET imager also includes an open aperture through which the object OBJ and the table 916 can pass, and gamma-rays emitted in opposite directions from the object OBJ due to an annihilation event can be detected by the GRDs and timing and energy information can be used to determine coincidences for gamma-ray pairs.

In FIG. 9B, circuitry and hardware is also shown for acquiring, storing, processing, and distributing gamma-ray detection data. The circuitry and hardware include: a processor 970, a network controller 974, a memory 978, and a data acquisition system (DAS) 976. The PET imager also includes a data channel that routes detection measurement results from the GRDs to the DAS 976, the processor 970, the memory 978, and the network controller 974. The DAS 976 can control the acquisition, digitization, and routing of the detection data from the detectors. In one implementation, the DAS 976 controls the movement of the bed 916. The processor 970 performs functions including reconstructing images from the detection data, pre-reconstruction processing of the detection data, and post-reconstruction processing of the image data, as discussed herein.

The processor 970 can be configured to perform various steps of methods 100 and/or 200 described herein and variations thereof. The processor 970 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 970 can execute a computer program including a set of computer-readable instructions that perform various steps of method 100 and/or method 200, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

The memory 978 can be a hard disk drive, CD-ROM drive, DVD drive, FLASH drive, RAM, ROM or any other electronic storage known in the art.

The network controller 974, such as an Intel Ethernet PRO network interface card from Intel Corporation of America, can interface between the various parts of the PET imager. Additionally, the network controller 974 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. An imaging apparatus, comprising:
processing circuitry configured to
obtain projection data for an object representing an intensity of radiation detected along a plurality of rays through the object,
obtain an outline of the object via a secondary imaging system, the secondary imaging system using non-ionizing radiation,
determine, based on the outline, a model and model parameters for the object,
calculate, based on the model and the model parameters, a volumetric attenuation map for the object, and
reconstruct, based on the projection data and the volumetric attenuation map, an attenuation-corrected volumetric image.

2. The apparatus of claim 1, wherein the processing circuitry is further configured to obtain the outline of the object by
obtaining at least one 2D image of the object;
identifying, via segmenting the object, locations and orientations of surfaces of the object; and
determining, based on the locations and orientations of the surfaces of the object, the outline of the object.

3. The apparatus of claim 2, wherein the processing circuitry is further configured to segment the object based on Hue Saturation Value (HSV) values.

4. The apparatus of claim 2, wherein the secondary imaging system includes at least one optical input device.

5. The apparatus of claim 2, wherein the secondary imaging system includes at least one infrared input device.

6. The apparatus of claim 1, wherein the processing circuitry is further configured to obtain the outline of the object by
obtaining at least one 3D scan of the object;
identifying, via segmenting the object, locations and orientations of surfaces of the object; and
determining, based on the locations and orientations of the surfaces of the object, the outline of the object.

7. The apparatus of claim 6, wherein the secondary imaging system includes at least one range-finding input device.

8. The apparatus of claim 1, wherein the model and model parameters are determined from a stored library.

9. The apparatus of claim 1, wherein the volumetric attenuation map for the object includes truncated regions and the processing circuitry is further configured to
obtain, via the secondary imaging system, truncated 3D volumetric attenuation data, and
merge the truncated 3D volumetric attenuation data with the volumetric attenuation map including truncated regions before reconstructing the attenuation-corrected volumetric image.

10. The apparatus of claim 9, wherein the circuitry is further configured to
combine the truncated 3D volumetric attenuation data with the outline of the object, and
combine the truncated 3D volumetric attenuation data with the model of the object.

11. A method of imaging, comprising:
obtaining projection data for an object representing an intensity of radiation detected along a plurality of rays through the object,
obtaining an outline of the object via a secondary imaging system, the secondary imaging system using non-ionizing radiation, determining, based on the outline, a model and model parameters for the object, calculating, based on the model and the model parameters, a volumetric attenuation map for the object, and reconstructing, based on the projection data and the volumetric attenuation map, an attenuation-corrected volumetric image.

12. The method of claim 11, wherein the step of obtaining the outline of the object further comprises:

obtaining at least one 2D image of the object;

identifying, via segmenting the object, locations and orientations of surfaces of the object; and determining, based on the locations and orientations of the surfaces of the object, the outline of the object.

13. The method of claim 12, wherein the object is segmented based on Hue Saturation Value (HSV) values.

14. The method of claim 12, wherein the secondary imaging system includes at least one optical input device.

15. The method of claim 11, wherein the step of obtaining the outline of the object further comprises:

obtaining at least one 3D scan of the object;

identifying, via segmenting the object, locations and orientations of surfaces of the object; and determining, based on the locations and orientations of the surfaces of the object, the outline of the object.

16. The method of claim 15, wherein the secondary imaging system includes at least one range-finding input device.

17. The method of claim 11, wherein the model and model parameters are determined from a stored library.

18. The method of claim 11, wherein the volumetric attenuation map for the object includes truncated regions and the method further comprises:

obtaining, via the secondary imaging system, truncated 3D volumetric attenuation data; and merging the truncated 3D volumetric attenuation data with the volumetric attenuation map including truncated regions before reconstructing the attenuation-corrected volumetric image.

19. The method of claim 18, further comprising:

combining the truncated 3D volumetric attenuation data with the outline of the object; and combining the truncated 3D volumetric attenuation data with the model of the object.

20. A non-transitory computer-readable storage medium including executable instructions, which when executed by circuitry, cause the circuitry to perform the method according to claim 11.

* * * * *